(12) United States Patent
Taghavi

(10) Patent No.: US 7,192,636 B2
(45) Date of Patent: Mar. 20, 2007

(54) MULTILAYER SHRINK FILM WITH POLYSTYRENE AND POLYETHYLENE LAYERS

(75) Inventor: Shane Taghavi, Toronto (CA)

(73) Assignee: Intertape Polymer Corp., Bradenton, FL (US)

( * ) Notice: Subject to any disclaimer, the term of this patent is extended or adjusted under 35 U.S.C. 154(b) by 0 days.

(21) Appl. No.: 10/731,452

(22) Filed: Dec. 9, 2003

(65) Prior Publication Data

US 2004/0166348 A1    Aug. 26, 2004

Related U.S. Application Data

(60) Provisional application No. 60/432,183, filed on Dec. 10, 2002.

(51) Int. Cl.
*B32B 7/02* (2006.01)
*B32B 27/08* (2006.01)
*B32B 27/32* (2006.01)

(52) U.S. Cl. .................. 428/213; 428/516; 428/517; 428/519; 428/520; 428/910

(58) Field of Classification Search ........... 428/213, 428/516, 517, 519, 520, 910
See application file for complete search history.

(56) References Cited

U.S. PATENT DOCUMENTS

| | | | |
|---|---|---|---|
| 3,555,604 A | 1/1971 | Pahlke | |
| 3,645,992 A | 2/1972 | Elston | |
| 4,011,382 A | 3/1977 | Levine et al. | |
| 4,076,698 A | 2/1978 | Anderson et al. | |
| 4,163,831 A | 8/1979 | Gessell | |
| 4,205,021 A | 5/1980 | Morita et al. | |
| 4,302,565 A | 11/1981 | Goeke et al. | |
| 4,302,566 A | 11/1981 | Karol et al. | |
| 4,359,561 A | 11/1982 | Fraser et al. | |
| 4,522,987 A | 6/1985 | Hogan et al. | |
| 4,692,380 A | 9/1987 | Reid | |
| 4,897,274 A * | 1/1990 | Candida et al. | 426/127 |
| 5,167,707 A | 12/1992 | Freeman et al. | |
| 5,389,448 A | 2/1995 | Schirmer et al. | |
| 5,759,648 A | 6/1998 | Idlas | |
| 5,837,335 A | 11/1998 | Babrowicz | |
| 5,885,699 A | 3/1999 | Watson et al. | |
| 6,060,136 A | 5/2000 | Patrick et al. | |
| 6,207,093 B1 | 3/2001 | Hanyu et al. | |
| 6,376,095 B1 | 4/2002 | Cheung et al. | |
| RE37,699 E | 5/2002 | Bradfute et al. | |
| 6,417,308 B2 | 7/2002 | Arai et al. | |
| 6,451,446 B1 | 9/2002 | Regnier | |
| 6,476,141 B1 | 11/2002 | Chang et al. | |
| 6,479,138 B1 | 11/2002 | Childress | |

OTHER PUBLICATIONS

J. H. Schut, "Polystyrene Blown Film Starts to Get Some Respect." Article in Plastics Technology, Nov. 2000 (www.plasticstechnology.com/articles/200011fal.html).

Diehl, et al., "Blends of Ethylene/Styrene Interpolymers and Other Polymers: Benefits in Applications." INDEX Interpolymers Conference Paper, presented at ANTEC 1999.

* cited by examiner

*Primary Examiner*—D. S. Nakarani
(74) *Attorney, Agent, or Firm*—Roberts Mardula & Wertheim, LLC (57) ABSTRACT

A multilayer shrink film and methods of making same comprising one or more polyethylenic layers, one or more polystyrenic layer and polystyrene compatibilizing layers situate between each polyethylenic layer and polystyrenic layer wherein the polystyrene compatibilizing layers comprise less than 1% by weight substantially random interpolymer. The multilayer shrink films of the invention are produced using film biaxial orienting means.

11 Claims, 4 Drawing Sheets

MULTILAYER SHRINK FILM WITH POLYSTYRENE AND POLYETHYLENE LAYERS

CROSS REFERENCE TO OTHER PATENT APPLICATIONS

This application claims priority under 35 U.S.C. §119 from U.S. provisional patent application Ser. No. 60/432,183 filed Dec. 10, 2002 of the same inventor, which is incorporated by reference in its entirety.

BACKGROUND OF THE INVENTION

The present invention relates to polyolefin films and biaxially oriented films with improved properties useable as shrink films. In particular, the present invention relates to shrink film for use in packaging lines, although the invention may also be used in other shrink film applications.

Polyolefins, polyvinyl chlorides, ionomers, polyesters, polystyrenes, and polyvinylidene chlorides have all been used in the production of shrink film. The shrinkable polyolefins currently on the market include both cross-linked and uncross-linked oriented polyethylene, oriented polypropylene, and oriented ethylene-propylene copolymers.

A shrink film's distinguishing characteristic is its ability upon exposure to some level of heat to shrink or, if restrained, to create shrink tension within the film. This ability is activated by a packager when a shrink film wrapped product is passed through a hot air or hot water shrink tunnel. Upon exposure to heat, the film shrinks around the product producing a tight, transparent wrapping that conforms to the contour of the product and which is aesthetically pleasing while providing the useful functions required of packaging materials such as protection of the product from loss of components, pilferage, damage due to handling and shipment, dirt and contamination.

Typical items wrapped in polyolefin shrink films are toys, games, sporting goods, stationery, greeting cards, hardware and household products, office supplies and forms, foods, phonograph records, and industrial parts.

The manufacture of shrink films requires sophisticated equipment including extrusion lines with "biaxial orientation" capability, mechanical center-folders, and slitters. Biaxial orientation can be accomplished with "tenter framing" stretching or "double bubble" blown film extrusion processes. The biaxial orientation causes the material to be stretched in the cross or transverse direction and in the longitudinal or machine direction. The films are usually heated to their orientation temperature range that varies with the different polymers but is usually above room temperature and below the polymer's melting temperature. After being stretched, the film is rapidly cooled to quench it thus freezing the molecules of the film in their oriented state. Upon heating, the orientation stresses are released and the film will begin to shrink back to its original unoriented dimension.

The polyolefin family of shrink films provide a wide range of physical and performance characteristics such as shrink force (the amount of force that a film exerts per unit area of its cross-section during shrinkage), the degree of free shrink (the reduction in surface area a material undergoes when unrestrained), tensile strength (the highest force that can be applied to a unit area of film before it begins to break), sealability, shrink temperature curve (the relationship of shrink to temperature), tear initiation and resistance (the force at which a film will begin to tear and continue to tear), optics (gloss, haze and transparency of material), and dimensional stability (the ability of the film to retain its original dimensions under all types of storage conditions).

In addition to the above, high speed automatic wrapping lines require that the shrink film have high film-film slip (low coefficient of friction), consistently strong static seals and higher stiffness compared to other shrink films. The high slip allows packages to freely pass one another on conveyors without sticking or clinging. The strong static seals allows for fast sealing of the packages. Finally, the higher stiffness supports high film and packaging line speeds.

Also particularly advantageous for high speed automatic wrapping lines are low shrink initiation temperature. Low initiation temperature allows faster "shrunken" film cool down due to the lower temperature. With a shorter cool down period, faster processing line speeds can be attained.

One approach to shrink films for high speed wrapping lines is a multilayer film comprising polyethylenic and polystyrenic layers. The differences between polystyrene and polyethylene layers require intervening compatabilizing layers for successful manufacture. U.S. Pat. No. 6,367,095 to Cheung et al. discloses random interpolymer useful for a compatabilizing layer. Such random interpolymers include the ethylene/styrene interpolymer resins prepared using a constrained-geometry catalyst. Unfortunately, Cheung compositions are presently expensive due to the cost of the interpolymer and may be subject to phase-out by the manufacturer.

Additional desirable characteristics of shrink films comprising polyethylenic and polystyrenic layers include: high oxygen permeability, high impact strength, high stiffness, excellent optics, printability, improved low temperature shrinkage, high capacity for additives (such as antifog additive), and radio frequency (RF) sealing.

Accordingly, it is a general object of the present invention to provide a shrinkable polyolefin film comprising polyethylenic and polystyrenic layers that will have improved properties for high speed packaging lines while not relying upon Cheung compositions for compatabilizing layers.

BRIEF SUMMARY OF THE INVENTION

The objects of this invention are multilayer shrink films and methods of making same. In particular the multilayer shrink films comprise one or more polyethylenic layers, one or more polystyrenic layer and polystyrene compatibilizing layers situated between each polyethylenic layer and polystyrenic layer wherein the polystyrene compatibilizing layers comprise less than 1% by weight substantially random interpolymer. In one embodiment, the multilayer shrink films of the invention are produced using biaxial orientation. Preferred biaxial orientation methods include double-bubble or tenter-frame biaxial orienting processes.

DETAILED DESCRIPTION OF THE INVENTION

Figure 1:
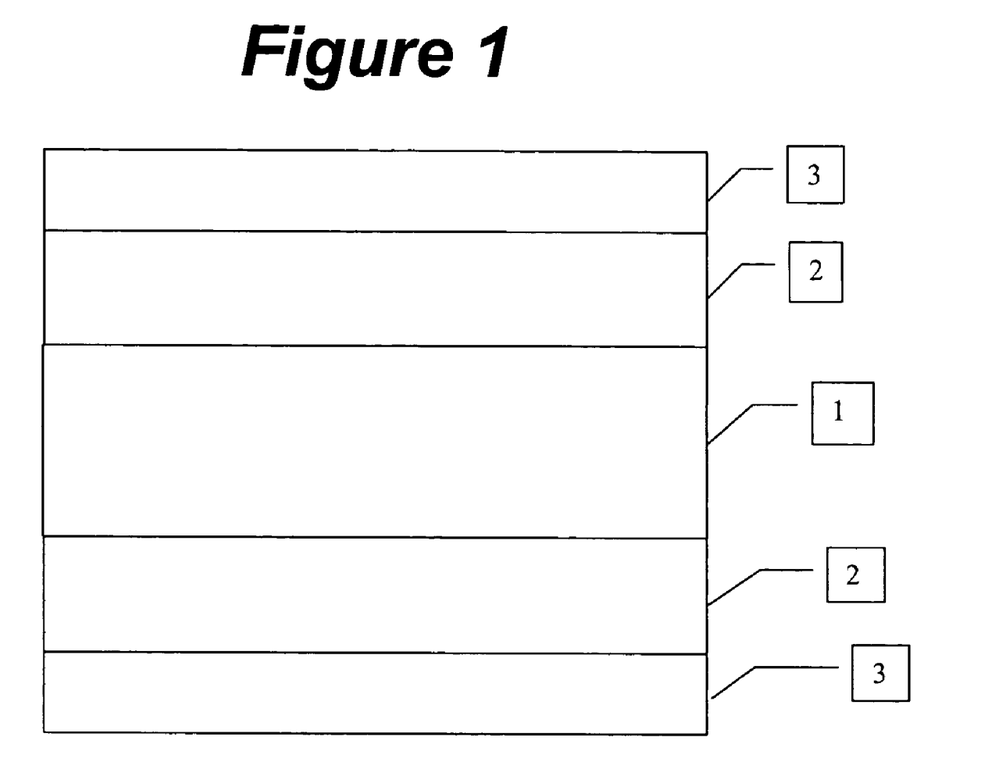
FIG. 1 illustrates a sectional view of one embodiment of the invention with polystyrenic core layer.
Figure 2:
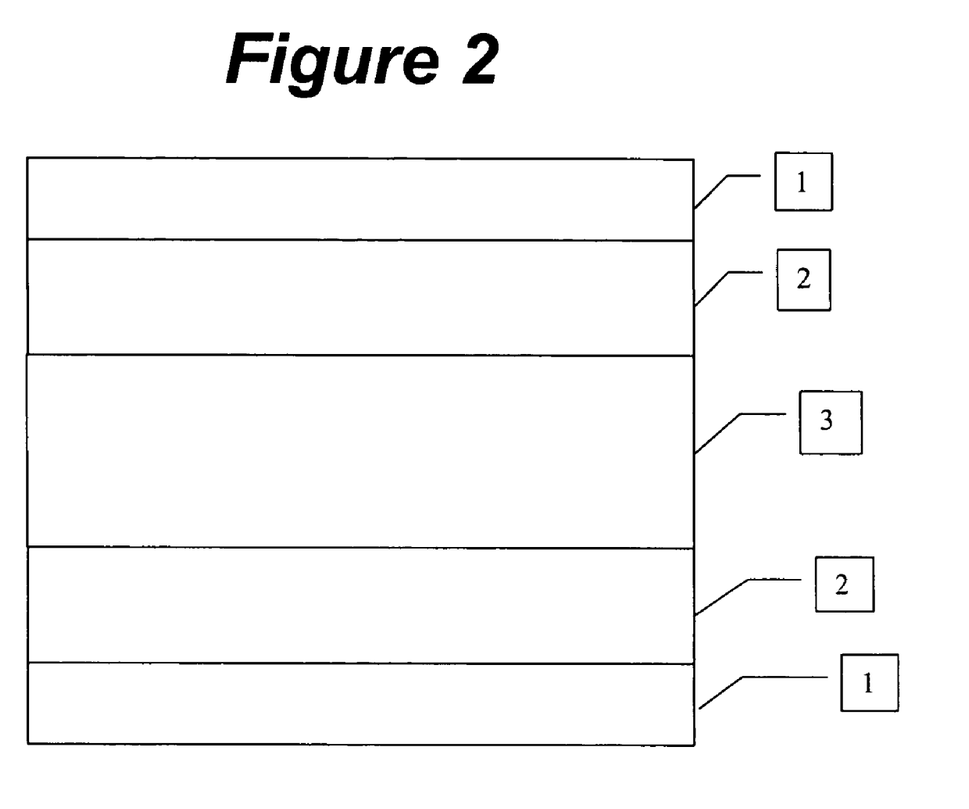
FIG. 2 illustrates a sectional view of one embodiment of the invention with polyethylenic core layer.

The present invention is directed toward multilayer shrink films suitable for use in high speed packaging lines. FIG. 1 and FIG. 2 illustrate sectional views of two different embodiments of the invention. The present invention comprises one or more polystyrenic layer(s) 1, one or more polyethylenic layer(s) 3 and compatabilizing layers 2. FIG. 1 illustrates polystyrenic layer 1 as the innermost layer with polyethylenic layers 3 comprising the outer layers. In contrast, the embodiment of FIG. 2 comprises polyethylenic layer 3 as the innermost layer with polystyrenic layers 1 comprising the outer layers Compatabilizing layers 2 of FIG. 1 and FIG. 2 comprise compatabilizing composition in amounts of 5 to 25% by weight of the layer. Compatabilizing layers 2 also comprise in large part the same or similar material as present in other layers.

The multilayer shrink films of the present invention will have the following relative amounts by layer: innermost layer 30–50% by weight; each compatabilizing layer 10–25% by weight; and each outermost layer 15–25% by weight. For example, a film may have 40% innermost layer, 10% each compatabilizing layer and 20% each outermost layer.

As used herein "polystyrenic polymer" refers to styrene homopolymers and copolymers and its analogs and homologs including α-methylstyrene and ring-substituted styrenes, particularly ring-methylated styrenes. The preferred styrenes are styrene and α-methylstyrene, and styrene is particularly preferred.

As used herein "polystyrenic layer" refers to a layer of a multilayer film comprising 65% or more by weight polystyrenic polymer. Suitable polystyrenic polymers include film grade polystyrenic polymer. Such polymers typically have a melt flow rate of 1 to 40 and preferably of 1 to 8. Film grade polystyrenic polymers are available commercially from numerous suppliers including Nova Chemicals, Shell Chemical Company, Dow Chemical, Atofina, Kraton Polymers and Samsung. For example, Nova Chemicals 1600 is a film grade polystyrene suitable for use as the polystyrenic polymer in the polystyrenic layers of the present invention.

As used herein "polystyrene toughener" refers to polymers and copolymers that when incorporated into a polystyrenic layer reduce the brittleness of the layer. Suitable polystyrene tougheners include styrene-isoprene diblock copolymer (SI) and styrene-isoprene triblock copolymer (SIS) and blends of diblock and triblock copolymer.

As used herein "polyethylenic polymer" refers to ethylenic homopolymers and copolymers that comprise a major proportion by weight of ethylene copolymerized with a minor proportion by weight of and α-olefin monomer containing about 3 to about 12, preferably about 4 to about 10, and more preferably about 4 to about 8, carbon atoms.

Polyethylenic copolymers include those commonly referred to as high density polyethylene (HDPE), low density polyethylene (LDPE), linear low density polyethylene (LLDPE), and very low density polyethylene (VLDPE). Preferably the ethylenic copolymers employed are those having from about 1 to about 20, preferably from about 1 to about 10 weight percent of said higher α-olefin monomer copolymerized therein. In addition, the α-olefin monomer employed in the ethylenic copolymer is preferably selected from the group consisting of 1-butene, 3-methyl-1-butene, 3-methyl-1-pentene, 1-hexene, 4-methyl-1-pentene, 3-methyl-1-hexene, 1-octene and 1-decene. Particularly preferred are the 1-octene α-olefins. The LLDPE resins are prepared at relatively low pressures employing coordination-type catalysts. Reference may be made to U.S. Pat. Nos. 3,645,992, 4,076,698, 4,011,382, 4,163,831, 4,205,021, 4,302,565, 4,302,566, 4,359,561 and 4,522,987 for more details of the manufacture and properties of LLDPE resins including those which are particularly useful herein.

High density polyethylene (HDPE) refers to a homopolymer of ethylene or a copolymer of a major portion by weight of ethylene with one or more α-olefins, the homopolymer or copolymer having a density greater than 0.940 g/cm$^3$, and a melting point between 125° C. and 140° C.

Low density polyethylene (LDPE) refers to a highly branched homopolymer of ethylene having a density between 0.915 and 0.930 g/cm$^3$, typically having long branches off the main backbone chain with alkyl substituents of 2 to 8 carbon atoms on these branches.

Very low density polyethylene (VLDPE) refers to a copolymer of a major portion by weight of ethylene with one or more α-olefins, the copolymer having a density greater than 0.86 and less than 0.915 g/cm$^3$, a melting point between 85° C. and 125° C., and a Vicat Softening Point (VSP) greater than 60° C. Very low density polyethylene (VLDPE) sometimes is also referred to as ultra low density polyethylene (ULDPE). VLDPE and ULDPE do not include ethylene, α-olefin copolymers of densities below about 0.90 g/cm$^3$ with elastomeric properties that are referred to as elastomers.

Linear low density polyethylene (LLDPE) refers to a copolymer of a major portion by weight of ethylene with one or more α-olefins, the copolymer having a density of at least 0.915 g/cm$^3$, a melting point between 115° C. and 130° C., and a Vicat Softening Point (VSP) greater than 60° C.

As used herein "polyethylenic layer" refers to a layer of a multilayer film comprising 75% or more by weight polyethylenic polymer or copolymer. Suitable polyethylenic polymers include film grade polyethylenic polymer and copolymer. Such polymers typically have a melt flow index of 0.5 to 5.0. Film grade polyethylenic polymers are available commercially from Nova Chemicals, Dow Chemical, Exxon, Union Carbide, Equistar, Mobil, and Chevron. Particularly preferred are the LLDPE film grade polyethylenic polymers and copolymer. For example, film grade LLDPE copolymers containing 1 to 10 weight percent octene monomer have proven suitable.

As used herein, "ethylene vinyl acetate copolymer" (EVA) refers to a copolymer formed from ethylene and vinyl acetate monomers wherein the ethylene derived units (monomer units) in the copolymer are present in major amounts (by weight) and the vinyl acetate derived units (monomer units) in the copolymer are present in minor, by weight, amounts.

As used herein "substantially random interpolymer" is a polymer or copolymer as described in U.S. Pat. No. 6,376,095 to Cheung et al.

As used herein "polystyrene compatibilizing layer" refers to a film layer acting as a bonding agent between polystyrenic layers and other layers of plastic films. Various mechanisms exist for compatibilizing agents in polymer blends. One mechanism acts to reduce interfacial energy between two polymers. Alternately, compatibilizing agents improve adhesion or otherwise modify the polymer interface. However, as used herein, the polystyrene compatibilizing layer refers to a layer of polymer composition that improves adhesion between two polymer layers, at least one of which is a polystyrenic layer.

Antiblock additives are known in the art and are in general used to prevent films from adhering to itself when stored in a roll (i.e. prevents film roll from becoming a solid block). Suitable antiblock additives for the outermost layers of the present invention include silica, talc, calcined diatomaceous silica products, behenamide as well as other synthetic antiblock materials. For example, antiblock agents are disclosed in U.S. Pat. No. 5,167,707 to Freeman et al., the contents of which are herein incorporated by reference. Antiblock additives are commercially available from producers such as A. Schulman, DuPont, Nova Chemicals, Lion Corporation, as well as others.

"Slip" additives are known in the art and are in general used to reduce the coefficient of friction on processing and conversion equipment. In the present invention, slip additives may be used as processing aids, particularly when needed for processability of a polystyrenic layer. Often used for slip additives are the primary amides, secondary amides and ethylenebisamides. Slip additives are available commercially from Ingenia, Ampacet, A. Schulman, along with numerous other producers. For example, 13-docosenamide (also known as erucamide) can be used as a suitable processing aid/slip additive in the polystyrenic layer(s) of the present invention.

Polystyrene is extremely brittle with low tensile strength, but orientation of the polymeric chains substantially increases its toughness. Surprisingly, applicant has now formed films of desired properties by incorporating polystyrene into the polystyrenic layer in conjunction with polystyrene compatibilizing layers.

As evidenced below, various alternate polystyrene compatibilizing layers have been discovered and include, for example, major amounts of LLDPE with lesser amounts of adhesive resins used as a polystyrene compatibilizing agent. Suitable adhesive resins include styrene-ethylene butylene-styrene block copolymer (SEBS), anhydride-modified ethylene vinyl acetate, styrene-butadiene block copolymer (SBS), styrene-butadiene rubber (SBR) butadiene rubber (BR), styrene-isoprene block copolymer (SIS), its hydrogenated product (SEPS), or styrene-butadiene-methyl methacrylate copolymer (MBS).

Numerous suitable adhesive resins are commercially available. For example, one polystyrene compatibilizing agent comprises a SEBS adhesive in a physical blend of polystyrene and polyethylene and is available from Nova Chemicals as CPR#1. SEBS adhesive is also available under the Kraton® brand, for example Kraton® G1657. Similarly, anhydride-modified ethylene vinyl acetate is available from DuPont under the Bynel® brand, for example Bynel® 3810.

In order to achieve cost effective polystyrene compatibilizing layers, it is preferred that the lesser cost LLDPE be present in greater amounts, the higher cost polystyrene compatibilizing agent comprise a smaller amount of the polystyrene compatibilizing layer and that less than 1% substantially random interpolymer be present. Preferably the polystyrene compatibilizing agent will comprise no more than 10 to 20% by weight of the polystyrene compatibilizing layer of the present invention.

The films of the present invention may be formed by any method known in the art of forming shrink films. Such methods normally consist of biaxially orientation processing equipment. In general, shrink film production can be of any suitable technique including the use of tenter frames and double bubble film processing. The double-bubble process is often referred to as the process described in U.S. Pat. No. 3,555,604 to Pahlke. U.S. Pat. No. 3,555,604 is incorporated herein by reference.

Figure 3:
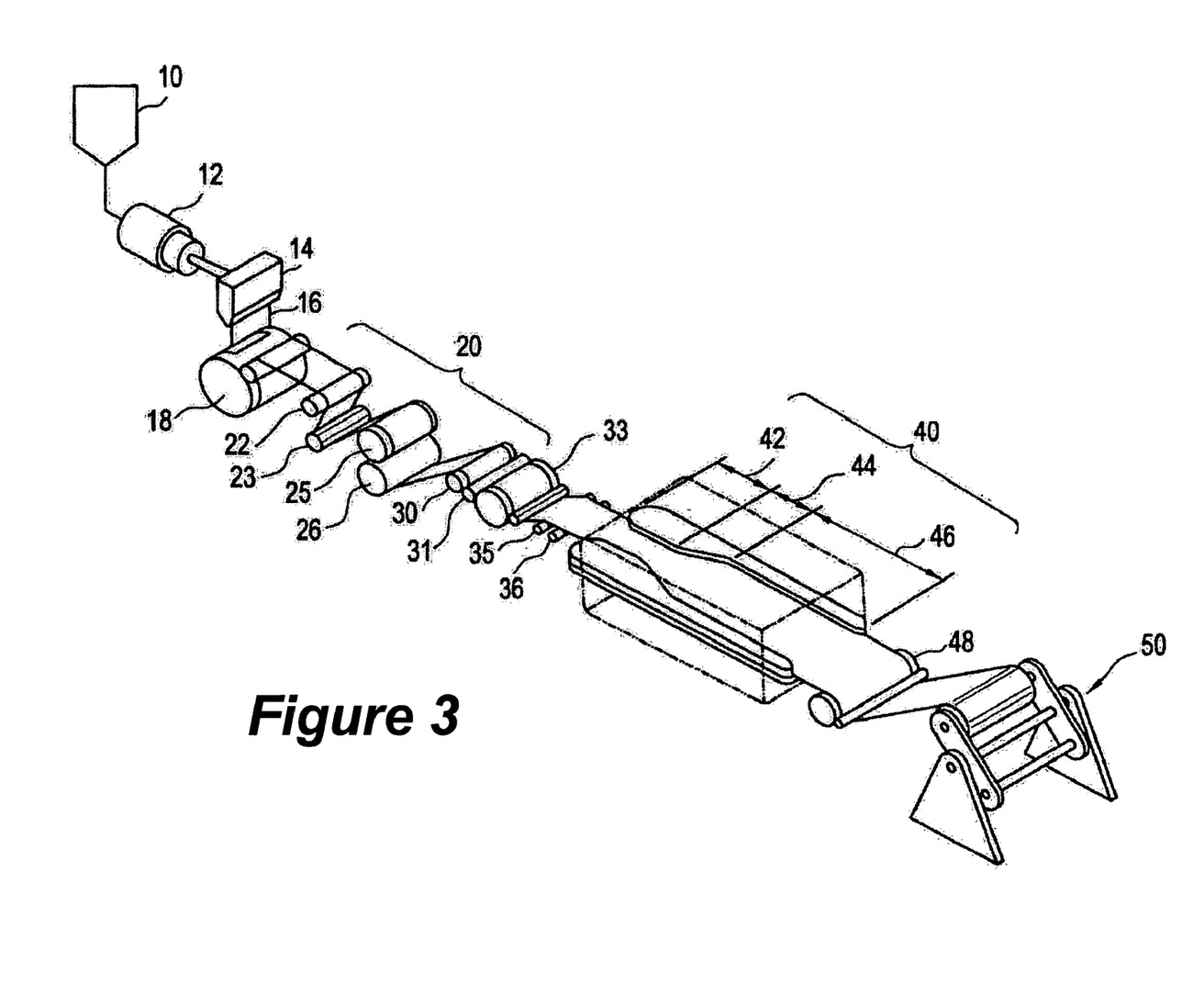
FIG. 3 illustrates a tenter-frame process for producing biaxially oriented films.

FIG. 3 illustrates the major components of such a double bubble processing line. The plastic feedstock 10 is fed into extruder 12. A primary bubble 120 forms by inflating the bubble as the melt exits die 122. Primary bubble 120 is cooled and collapsed as it passes through rollers 124. The resulting collapsed tube is then re-inflated to form the second bubble. The second bubble is heated to its draw temperature by means of external heaters 148, 146, 144, and 142. The amount of inflation determines the degree of orientation in the transverse direction. Machine direction orientation is imparted by having speed of the exit rollers 134 greater than the inlet rollers 128.

Features required to properly control the double-bubble process are further described in the Pahlke patent. Such features include special design of extruder die 122, air cooling areas 151 and 154 and guide rollers 132.

For the most part the double-bubble process results in a biaxially oriented film that is simultaneously oriented in both the machine and transverse directions. This is in contrast to the tenter frame processing line where first machine direction orientation is followed by transverse (tenter direction) orientation.

During processing of multilayer polyolefin films, it is often desirable to further enhance the film properties by crosslinking the layers of the film. An exemplary method of crosslinking is the exposure of the film to electromagnetic radiation. In the double bubble process, the irradiating equipment may be situated so as to irradiate the collapsed tube (i.e. between rollers 124 and rollers 128 of FIG. 3).

An example of the use of tenter frames is disclosed in U.S. Pat. No. 6,207,093 to Hanyu et al. As described in the Hanyu et al. patent, the entire disclosure of which is incorporated herein by reference, the polymer or polymers used to make the film are melted and then passed through an extruder to a slot die mechanism after which it is passed over a first roller, characterized as a chill roller, which tends to solidify the film. The film is then oriented by stressing it in a longitudinal direction, characterized as the machine direction, and in a transverse direction to arrive at a film which can be characterized in terms of orientation ratios, sometimes also referred to as stretch ratios, in both longitudinal and transverse directions.

The machine direction orientation is accomplished through the use of two sequentially disposed rollers, the second or fast roller operating at a speed in relation to the slower roller corresponding to the desired orientation ratio. This may alternatively be accomplished through a series of rollers with increasing speeds, sometimes with additional intermediate rollers for temperature control and other functions. After the film has been stressed in the machine direction, it is again cooled and then pre-heated and passed into a lateral stressing section, for example, a tenter frame mechanism, where it is again stressed, this time in the transverse direction. Orientation in the transverse direction is often followed by an annealing section.

Subsequently, the film is then cooled and may be subjected to further treatment, such as a surface treatment (for example corona treatment or flame treatment). The film may also be metallized as described in U.S. Pat. No. 4,692,380 to Reid. While corona and flame treatment typically occurs immediately following orientation and prior to the initial roll up, metallizing is typically performed at a separate time and location.

Figure 4:
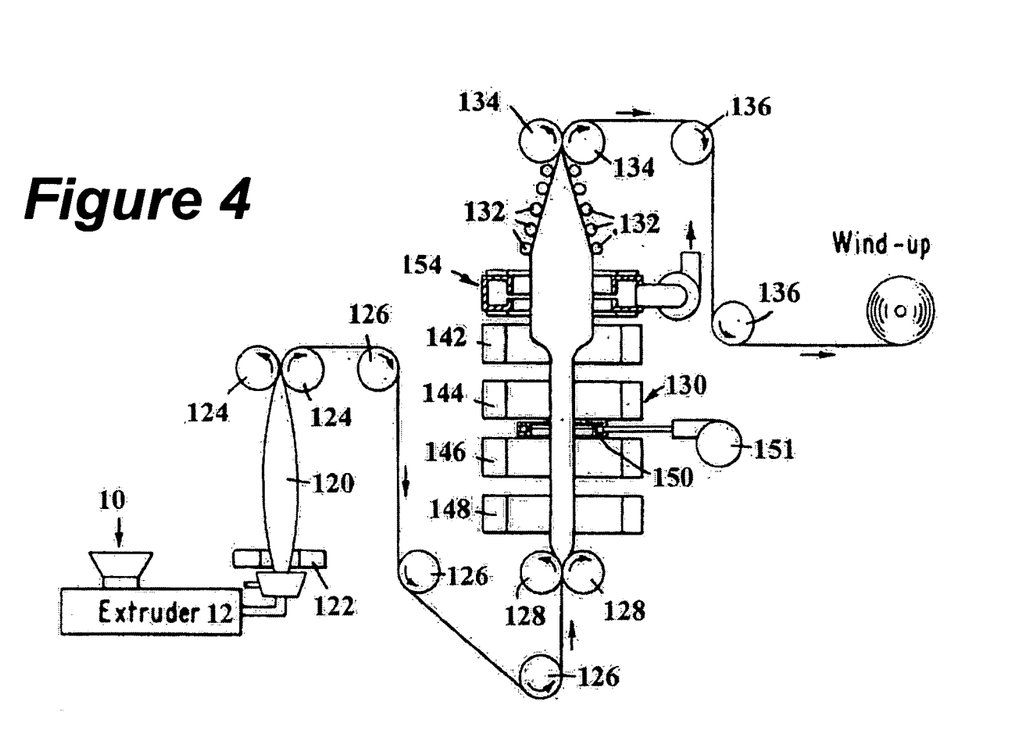
FIG. 4 illustrates a double-bubble process for producing biaxially oriented films.

FIG. 4 illustrates the apparatus described in the Hanyu et al. patent that may be employed in producing biaxially-oriented polyolefin film in accordance with the present invention. In FIG. 4, a source of molten polymer is supplied from a heated hopper 10 to an extruder 12 and from there to a slot die 14 which produces a flat, relatively thick film 16 at its output. Film 16 is applied over a chill roller 18, and it is cooled to a suitable temperature. The film is drawn off the chill roller 18 to a stretching section 20 to which the machine direction orientation occurs by means of idler rollers 22 and 23 that lead to preheat rollers 25 and 26.

As the film is drawn off the chill roller 18 and passed over the idler rollers, it is cooled to a temperature of about 30–60° C. In stretching the film in the machine direction, it is heated by preheat rollers 25 and 26 to an incremental temperature increase of about 60–100° C. and is oriented by fast roller 31 operating at a suitable speed greater than that of the preheat rollers in order to orient the film in the machine direction.

As the oriented film is withdrawn from the fast roller 31, it is passed over a roller 33 at room temperature conditions. From here it is passed over rollers to a lateral stretching section 40 where the film is oriented by stretching in the transverse direction. The section 40 includes a preheat section 42 comprising a plurality of tandem heating rollers (not shown) where it is reheated to a temperature within the range of 130–180° C. From the preheat section 42 of the tenter frame, the film is passed to a stretching or draw section 44 where it is progressively stretched by means of tenter clips (not shown) which grasp the opposed sides of the film and progressively stretch it laterally until it reaches its maximum lateral dimension. The concluding portion of the lateral stretching phase includes an annealing section 46, such as an oven housing, where the film is heated at a temperature within the range of 130–170° C. for a suitable period in time. The annealing time helps control certain properties, and increased annealing is often specifically used to reduce shrinkage.

The biaxially oriented film is then withdrawn from the tenter frame and passed over a chill roller 48 where it is reduced to a temperature of less than about 50° C. and then applied to take-up spools on a take-up mechanism 50. Typically, the initial orientation in the machine direction is carried out at a somewhat lower temperature than the orientation in the lateral dimension. For example, the film may be stretched in the machine direction at a temperature of about 120° C. and stretched in the lateral dimension at a temperature of 160° C.

Various properties are used to measure the performance of polyolefin compositions and films made therefrom. Described below are some of the methods used.

Tensile Strength: The tensile strength including stress and elongation at break were measured for samples of produced film by American Society for Testing and Materials (ASTM) test method D882. Test speed was 2 inch/minute and a jaw separation of 4". ASTM test method D882 was similarly used to measure tangent modulus, peak stress, energy to peak load and % elongation at peak. For the latter measurements a test speed of 0.4 inch/minute and a jaw separation of 4" were used.

Biaxially oriented film produced is tested for processability as well optical qualities. One of the processability measures is the natural draw ratio, determined at 280° F. (138° C.). Another measure is the area under the yield/stress curve. Lower area values and higher natural draw ratios indicate greater processability.

Optical properties were determined on samples stretched to an average thickness of 0.6 mils (15 µm). Optical properties include haze, transmittance and gloss. Haze and luminous transmittance were determined in accordance with ASTM test method D1003. In general, lower haze films will have higher transmittance. Specular gloss was measured generally in accordance with ASTM test method D2457. ASTM test method D2457 refers to measurements at 20, 45 and 65 degrees.

The invention is illustrated, but not limited by the following examples:

EXAMPLES

Examples were produced in accordance with FIG. 1. The innermost layer of the five layer films is a polystyrenic layer and the outermost layers are polyethylenic layers.

Early attempts at preparing the biaxially oriented films of the present invention met with limited success. Problems encountered were maintaining the second bubble of a double-bubble processing line. In general the polystyrenic polymers are extremely brittle with comparably low tensile strength. Fortunately, biaxial orientation acts to reduce the brittleness by toughening the film layer. The polystyrene compatibilizing layer is selected for adhesion between polyethylenic and polystyrenic layers as well as low haze and good tensile strength. The following examples illustrate four embodiments of the invention.

All of the examples used an identical composition for outermost polyethylenic layers comprising approximately 88% by weight LLDPE, 9% by weight EVA and 3% antiblock.

Examples 1, 2 and 3 used a blend of LLDPE and anhydride modified ethylene vinyl acetate (DuPont Grade Bynel® 3810) for the in-between polystyrene compatabilizing layers. Surprisingly it was found that a small amount of EVA in outermost polyethylenic layers allowed reduced amounts of expensive compatabilizing agent to be used in the compatabilizing layers. Example 4 used a blend of LLDPE and SEBS (Nova Chemicals Grade CPR#1) for the in-between polystyrene compatabilizing layers.

The innermost polystyrenic layer may include from 70% to 90% polystyrenic polymer by weight of the layer. In Examples 1–4, the polystyrene represented 70% to 75% by weight of the innermost polystyrenic layer. Examples 1 and 2 used a blend of two polystyrenes, namely Nova Chemicals Grade 1600 and Grade 3900. It was found that little difference in performance was attributable to using the blended polystyrene vs. a single polystyrene resin. Examples 3 and 4 used the single polystyrene Nova Chemicals Grade 1600.

Processability and film properties were deemed highest in the films of Examples 3 and 4. Film property testing was performed and was compared to a film using a substantially random interpolymer system (compare film).

Example 1

Anhydride Modified EVA Compatabilizing Agent

A 5 layer shrink film in accordance with FIG. 1 was prepared using a double-bubble apparatus. Inner polystyrenic layer 1 comprised approximately 40% of the weight of the film. Two polyethylenic layers 3 comprised approximately 30% of the weight of the film (approximately 15% in each layer). Compatabilizing layers 2 situated between polystyrenic layer 1 and each polyethylenic layers 3 comprised the remaining approximate 30% weight of the film (approximately evenly divided, or 15% in each layer 2). Composition of the film is presented in Table 1.

TABLE 1

Example 1 Film

| | Concentration (wt %) |
|---|---|
| Polyethylenic Layers 3 Composition (30% total, approx. 15% each layer) | |
| Polyethylene (LLDPE) | 88 |
| EVA | 9 |
| Antiblock additive | 3 |
| Compatabilizing Layers 2 Composition (30% total, approx. 15% each layer)) | |
| Polyethylene (LLDPE) | 80 |
| Dupont anhydride-modified ethylene vinyl acetate, Bynel 3810 | 20 |
| Polystyrenic Layer 1 Composition (40%) | |
| Polystyrene, Nova 1600 | 37 |
| Polystyrene, Nova 3900 | 37 |
| Dupont anhydride-modified ethylene vinyl acetate, Bynel 3810 | 20 |
| Slip Additive | 6 |

Example 2

Anhydride Modified EVA Compatabilizing Agent

A 5 layer shrink film in accordance with FIG. 1 was prepared using a double-bubble apparatus. Inner polystyrenic layer 1 comprised approximately 40% of the weight of the film. Two polyethylenic layers 3 comprised approximately 30% of the weight of the film (approximately 15% in each layer). Compatabilizing layers 2 situated between polystyrenic layer 1 and each polyethylenic layers 3 comprised the remaining approximate 30% weight of the film (approximately evenly divided, or 15% in each layer 2). Composition of the film is presented in Table 2.

TABLE 2

Example 2 Film

| | Concentration (wt %) |
|---|---|
| Polyethylenic Layers 3 Composition (30% total, approx. 15% each layer) | |
| Polyethylene (LLDPE) | 88 |
| EVA | 9 |
| Antiblock additive | 3 |
| Compatabilizing Layers 2 Composition (30% total, approx. 15% each layer)) | |
| Polyethylene (LLDPE) | 80 |
| Dupont anhydride-modified ethylene vinyl acetate, Bynel 3810 | 20 |
| Polystyrenic Layer 1 Composition (40%) | |
| Polystyrene, Nova 1600 | 35 |
| Polystyrene, Nova 3900 | 35 |
| Dupont anhydride-modified ethylene vinyl acetate, Bynel 3810 | 14 |
| styrene-isoprene-styrene block copolymers, Dexco Polymers, Vector 4111 | 10 |
| Slip Additive | 6 |

Processability of Example 2 film was improved over that of Example 1 by the addition of the Dexco polystyrene toughener Vector® 4111 to the innermost polystyrenic layer.

Example 3

Anhydride Modified EVA Compatabilizing Agent

A 5 layer shrink film in accordance with FIG. 1 was prepared using a double-bubble apparatus. Inner polystyrenic layer 1 comprised approximately 30% of the weight of the film. Two polyethylenic layers 3 comprised approximately 35% of the weight of the film (approximately 17.5% in each layer). Compatabilizing layers 2 situated between polystyrenic layer 1 and each polyethylenic layers 3 comprised the remaining approximate 35% weight of the film (approximately evenly divided, or 17.5% in each layer 2). Composition of the film is presented in Table 3. The film was biaxially oriented using a double-bubble process to achieve a final thickness of 60 gauge.

TABLE 3

Example 3 Film

| | Concentration (wt %) |
|---|---|
| Polyethylenic Layers 3 Composition (35% total, approx. 17.5% each layer) | |
| Polyethylene (LLDPE) | 88 |
| EVA | 9 |
| Antiblock additive | 3 |
| Compatabilizing Layers 2 Composition (35% total, approx. 17.5% each layer)) | |
| Polyethylene (LLDPE) | 95 |
| Dupont anhydride-modified ethylene vinyl acetate, Bynel 3810 | 5 |
| Polystyrenic Layer 1 Composition (30%) | |
| Polystyrene, Nova 1600 | 70 |
| Dupont anhydride-modified ethylene vinyl acetate, Bynel 3810 | 10 |
| styrene-isoprene-styrene block copolymers, Dexco Polymers, Vector 4114 | 15 |
| Slip Additive | 5 |

Processability and properties of Example 3 film was improved over that of both Example 1 and Example 2 films. The use of Dexco polystyrene toughener Vector® 4114 instead of Vector® 4111 did not appear to affect film properties. Vector® 4114 has a higher melt flow rate and lower tensile strength compared to Vector® 4111.

Example 4

SEBS Compatibilizing Agent

A 5 layer shrink film in accordance with FIG. 1 was prepared using a double-bubble apparatus. Inner polystyrenic layer 1 comprised approximately 30% of the weight of the film. Two polyethylenic layers 3 comprised approximately 35% of the weight of the film (approximately 17.5% in each layer). Compatabilizing layers 2 situated between polystyrenic layer 1 and each polyethylenic layers 3 comprised the remaining approximate 35% weight of the film (approximately evenly divided, or 17.5% in each layer 2). Composition of the film is presented in Table 3. The film was biaxially oriented using a double-bubble process to achieve a final thickness of 60 gauge.

TABLE 4

Example 4 Film

| | Concentration (wt %) |
|---|---|
| Polyethylenic Layers 3 Composition (35% total, approx. 17.5% each layer) | |
| Polyethylene (LLDPE) | 88 |
| EVA | 9 |
| Antiblock additive | 3 |
| Compatabilizing Layers 2 Composition (35% total, approx. 17.5% each layer)) | |
| Polyethylene (LLDPE) | 85 |
| Nova Chemicals SEBS blend, CPR #1 | 15 |
| Polystyrenic Layer 1 Composition (30%) | |
| Polystyrene, Nova 1600 | 70 |
| Kraton SEBS | 14 |
| styrene-isoprene-styrene block copolymers, Dexco Polymers, Vector 4111 | 10 |
| Slip Additive | 6 |

Processability and properties of Example 4 film was improved over that of both Example 1 and Example 2 films and comparable to that of Example 3 film. Example 4 film has the advantages of stronger bonding between polyethylenic and polystyrenic layers, higher temperature resistance and low odor. Both Example 3 and Example 4 films provide adequate properties for a shrink film. The inventive films have lower tensile strength and lower shrinkage but comparable modulus as compared to the Compare film. The lower shrinkage correlates roughly into lower shrink force that is advantageous in many packaging applications. For example, low shrink force is desirable for packaging deformable products.

With minor adaptations the example films of the present invention may also be produced per FIG. 2 with the polystyrenic layer as the outermost layers. For example, the film orientation equipment and techniques often require adjustment and modification to accommodate outer polystyrenic layers.

The present invention may further comprise additives directed at improving the processability or final properties of the film. Such additives include antifog, slip enhancers, anti-block agents, combined slip and anti-block additives, ultraviolet light inhibitors and absorbers. For example, antiblock and slip additives amount to approximately 6% by weight of the example films.

Antifogging or antistatic agents can be added to the films and sheets of the present invention to increase surface conductivity and prevention of water droplet formation and attraction of dust and dirt on the film surface. Antifogging agents include, but are not limited to, glycerol monostearate, glycerol mono-oleate, lauric diphthalamides, ethoxylated amines, ethoxylated esters, and other additives known in the industry. When used, they may be present in amounts as high as 15% by weight of the outer film layer.

Other additives and processing aids may be added and include, for example, antioxidants (e.g., hindered phenols such as, for example, Irganox® 1010, and phosphites, e.g., Irgafos® 168, (both are registered trademarks of, and supplied by Ciba-Geigy Corporation, N.Y.), U.V. stabilizers (including Tinuvin® 328 and Chimassorb® 944, both are registered trademarks of, and supplied by Ciba-Geigy Corporation, N.Y., Ampacet Corporation UV100, based on Ciba Specialty Chemical's proprietary Shelfplus®), flame retardant agents (available from A. Schulman of Akron, Ohio, Clariant of Easton, Md. and Technical Polymer Representatives of Amherst, Ohio), cling additives (e.g., polyisobutylene), slip agents (such as erucamide and/or stearamide), antiblock additives, printable additives, A. Schulman paper match additives, polar additives, colorants, and pigments, to the extent that such additives do not interfere with the shrink and adhesive properties of the films.

Exemplary classes of oils useful as processing aids include white mineral oil (such as Kaydol® oil (available from Witco), and Shellflex® 371 naphthenic oil (available from Shell Oil Company). Another suitable oil is Tuflo® oil (available from Lyondell).

Tackifiers can also be added to the polymer compositions used to prepare the films or sheets of the present invention in order to alter the glass transition temperature ($T_g$) and thus extend the available application temperature window of the film. Examples of the various classes of tackifiers include, but are not limited to, aliphatic resins, polyterpene resins, hydrogenated resins, pure monomer hydrocarbon resin, styrene/α-methylene styrene resins, mixed aliphatic-aromatic resins, hydrogenated pure monomer hydrocarbon resin, modified styrene copolymers, pure aromatic monomer copolymers, and hydrogenated aliphatic hydrocarbon resins. Examples of aliphatic resins include those available under the trade designations Escorez®, Piccotac®, Mercures®, Wingtack®, Hi-Rez®. Quintone®, Tackirol®, etc. Examples of polyterpene resins include those available under the trade designations Nirez®, Piccolyte®, Wingtack®, Zonarez®, etc. Exemplary hydrogenated resins include those available under the trade designations Escorez®, Arkon®, Clearon®, etc. Examples of mixed aliphatic-aromatic resins include those available under the trade designations Escorez®, Regalite®, Hercures®, AR®, Imprez®, Norsolene®, M, Marukarez®, Arkon®, M, Quintone®, Wingtack®, etc. Particularly preferred classes of tackifiers include the styrene/α-methylene styrene tackifiers available from Hercules and styrene/α-methyl styrene tackifiers such as Wingtack® 86, Hercotac® 1149, Eastman H-130, and the like.

Also included as a potential component of the polymer compositions used in the present invention are various organic and inorganic fillers, the identity of which depends upon the type of application for which the elastic film is to be utilized. Representative examples of such fillers include organic and inorganic fibers such as those made from asbestos, boron, graphite, ceramic, glass, metals (such as stainless steel) or polymers (such as aramid fibers) talc, carbon black, carbon fibers, calcium carbonate, alumina trihydrate, glass fibers, marble dust, cement dust, clay feldspar, silica or glass, fumed silica, alumina, magnesium oxide, magnesium hydroxide, antimony oxide, zinc oxide, barium sulfate, aluminum silicate, calcium silicate, titanium dioxide, titanates, aluminum nitride, $B_2O_3$, nickel powder or chalk.

Although the present invention has been described in terms of specific embodiments, various substitutions of materials and conditions can be made as will be known to those skilled in the art. For example, single site catalyzed LLDPE (e.g. metallocene catalyzed LLDPE) may replace LLDPE for processing to thinner gauges. In addition, constituents of a given layer may be combined into a master batch instead of being formed at the time of extrusion. Other variations will be apparent to those skilled in the art and are meant to be included herein. The scope of the invention is only to be limited by the following claims:

What is claimed is:

1. A five layer shrink film comprising:
a first outer polyethylenic layer;
a second outer polyethylenic layer;
a core polystyrenic layer comprising from 70% to 75% by weight styrene homopolymer or α-methylstyrene homopolymer, from 10% to 15% by weight polystyrene toughener, from 10% to 20% by weight adhesive resin, and from 5% to 6% by weight slip additive;
a first polystyrene compatibilizing layer between the core polystyrenic layer and the first outer polyethylenic layer; and
a second polystyrene compatibilizing layer between the core polystyrenic layer and the second outer polyethylenic layer;
wherein the polystyrene compatabilizing layers comprise less than 1% by weight substantially random interpolymer.

2. The film of claim 1 wherein the first and second polyethylenic layers comprise at least 80% linear low density polyethylene copolymer.

3. The film of claim 2 wherein the linear low density polyethylene copolymer is a copolymer comprising from 1% to 10% by weight 1-octene monomer.

4. The film of claim 1 wherein the polystyrene toughener is selected from the group consisting of styrene-isoprene diblock copolymer, styrene-isoprene triblock copolymer, and blends of styrene-isoprene diblock copolymer and styrene-isoprene triblock copolymer.

5. The film of claim 1 wherein the slip additives in the polystyrenic layer are selected from the group consisting of primary amides, secondary amides, ethylenebisamides and 13-docosenamide.

6. The film of claim 1 wherein each of the first and second polystyrenic compatibilizing layers comprise from 70% to 90% by weight linear low density polyethylene copolymer and from 5% to 20% by weight of an adhesive resin used as a polystyrene compatibilizing agent.

7. The film of claim 6 wherein the adhesive resin is selected from the group consisting of styrene-ethylene butylene-styrene block copolymer, anhydride-modified ethylene vinyl acetate, styrene-butadiene block copolymer, styrene-butadiene rubber, butadiene rubber, styrene-isoprene block copolymer, hydrogenated styrene-isoprene block copolymer, and styrene-butadiene-methyl methacrylate copolymer.

8. The film of claim 1 wherein the core polystyrenic layer comprises α-methylstyrene homopolymer.

9. The film of claim 1 wherein the core polystyrenic layer comprises styrene homopolymer.

10. A five layer shrink film comprising:
a first outer polyethylenic layer comprising 15% to 25% by weight of the film;
a second outer polyethylenic layer comprising 15% to 25% by weight of the film;
a core polystyrenic layer comprising 30% to 50% by weight of the film, the polystyrenic layer comprising from 70% to 75% by weight of the layer styrene homopolymer or α-methylstyrene homopolymer, from 10% to 15% by weight of the layer polystyrene toughener, from 10% to 20% by weight of the layer adhesive resin, and from 5% to 6% by weight of the layer slip additive;
a first polystyrene compatibilizing layer between the core polystyrenic layer and the first outer polyethylenic layer comprising 10% to 25% by weight of the film;
a second polystyrene compatibilizing layer between the core polystyrenic layer and the second outer polyethylenic layer comprising 10% to 25% by weight of the film;
wherein the first and second polystyrene compatabilizing layers comprise less than 1% by weight substantially random interpolymer; and
wherein each of the first and second polystyrene compatabilizing layers comprise 5% to 20% by weight of the layer anhydride-modified ethylene vinyl acetate.

11. A five layer shrink film comprising:
a first outer polyethylenic layer comprising 15% to 25% by weight of the film;
a second outer polyethylenic layer comprising 15% to 25% by weight of the film;
a core polystyrenic layer comprising 30% to 50% by weight of the film;
a first polystyrene compatibilizing layer between the core polystyrenic layer and the first outer polyethylenic layer comprising 10% to 25% by weight of the film;
a second polystyrene compatibilizing layer between the core polystyrenic layer and the second outer polyethylenic layer comprising 10% to 25% by weight of the film;
wherein the polystyrenic layer comprises 70% to 75% by weight of the layer styrene homopolymer or α-methylstyrene homopolymer, 10% to 15% by weight of the layer polystyrene toughener, 10% to 20% by weight of the layer adhesive resin and from 5% to 6% by weight of the layer slip additive;
wherein the first and second polystyrene compatabilizing layers together comprise less than 1% by weight interpolymer; and
wherein the first and second polystyrene compatabilizing layers each comprise 5% to 20% by weight of the layer styrene-ethylene butylene-styrene block copolymer.

* * * * *